(12) United States Patent
Capomaggio

(10) Patent No.: US 8,358,104 B2
(45) Date of Patent: Jan. 22, 2013

(54) CONTACTLESS BATTERY CHARGING DEVICE AND PROCESS

(75) Inventor: Gregory Capomaggio, Meudon (FR)

(73) Assignee: Gemalto SA, Meudon (FR)

( * ) Notice: Subject to any disclaimer, the term of this patent is extended or adjusted under 35 U.S.C. 154(b) by 336 days.

(21) Appl. No.: 12/747,389

(22) PCT Filed: Nov. 24, 2008

(86) PCT No.: PCT/EP2008/066075
§ 371 (c)(1),
(2), (4) Date: Jun. 10, 2010

(87) PCT Pub. No.: WO2009/074448
PCT Pub. Date: Jun. 18, 2009

(65) Prior Publication Data
US 2010/0259216 A1    Oct. 14, 2010

(30) Foreign Application Priority Data
Dec. 10, 2007    (EP) .................................... 07291480

(51) Int. Cl.
*H02J 7/00*   (2006.01)
*H04B 7/185*  (2006.01)
*H04B 5/00*   (2006.01)
*H04B 1/38*   (2006.01)

(52) U.S. Cl. ... 320/108; 455/13.4; 455/41.1; 455/127.1; 455/522; 455/573

(58) Field of Classification Search ............ 320/108
See application file for complete search history.

(56) References Cited

U.S. PATENT DOCUMENTS

| 5,300,875 | A  | * | 4/1994  | Tuttle ........................ 320/138 |
| 6,291,968 | B1 |   | 9/2001  | Nantz |
| 6,788,953 | B1 | * | 9/2004  | Cheah et al. ............. 455/550.1 |
| 7,212,110 | B1 |   | 5/2007  | Martin |
| 7,860,680 | B2 | * | 12/2010 | Arms et al. ................. 702/127 |
| 2004/0001453 | A1 |   | 1/2004 | Kawai |
| 2004/0080299 | A1 |   | 4/2004 | Forster |
| 2006/0012464 | A1 |   | 1/2006 | Nitzan |
| 2007/0182367 | A1 |   | 8/2007 | Partovi |

FOREIGN PATENT DOCUMENTS

| DE | 10 2004 039649 A1 | 3/2006 |
| WO | WO 03/091943 A1   | 11/2003 |
| WO | WO 2006/018231 A1 | 2/2006 |
| WO | WO 2006/085246 A1 | 8/2006 |
| WO | WO 2006/109032 A1 | 10/2006 |
| WO | WO 2007/122439 A1 | 11/2007 |

* cited by examiner

*Primary Examiner* — M'Baye Diao
(74) *Attorney, Agent, or Firm* — The Jansson Firm; Pehr B. Jansson

(57) ABSTRACT

To recharge the battery of a portable object communicating with a reader establishing communication over a modulated electromagneticfield, a recharging process is proposed. The portable object sends at least one waiting message to the reader. The said waiting message tells the reader a waiting time WTXM before the next message. The portable object uses energy from the electromagnetic field to recharge its battery during the waiting period.

11 Claims, 3 Drawing Sheets

CONTACTLESS BATTERY CHARGING DEVICE AND PROCESS

BACKGROUND OF THE INVENTION

1. Field of the Invention

The invention relates to a process and a contactless battery charging device. More particularly, the invention relates to devices using communication by modulation of a supply electromagnetic field and furthermore having a battery to operate outside the supply electromagnetic field.

2. Description of the Related Art

In the world of smart cards, or other similar small portable devices with integrated circuits, an external power supply has been used for a very long time. One of the main reasons is that it is not easy to integrate a battery into an object of small size. Thus, the communication protocols used require a power supply for the card, either by contact, for example the ISO 7816 protocol, or without contact, for example the ISO 14443 protocol.

In the ,world of contactless smart card readers, it is common to couple a peripheral card reader to a personal computer (PC). The PC/SC standard was defined by the PS/SC Workgroup in order to standardise data exchanges between PC and card. The PC/SC standard is most often used to exchange data between the host and contactless device. The PC/SC standard uses the communication protocol defined in ISO standard 14443-4, better known under the heading T=CL, intended for exchange of messages commonly called frames or "Blocks", in which three types of blocks are distinguished:

- I-Blocks: blocks enabling information exchange between a reader and contactless device.
- R-Blocks: blocks enabling receipt of blocks previously sent between a reader and a contactless device to be acknowledged.
- S-Blocks: blocks enabling synchronisation of the communication protocol between a reader and a contactless device.

The PC/SC standard has the particular feature of implementing a detection mode that, when no "useful" data is transmitted between the reader and the contactless device (suspended communication), allows the reader to know if the contactless device is still present or has been removed from the reader, by regularly exchanging "non-useful" blocks with the device. The PC/SC standard proposes two types of blocks, sent by the reader, enabling detection of the presence of the contactless device:

- R-Block(NAK): during receipt of this block the contactless device retransmits the last block of information sent.
- Empty I-Block: during receipt of this block the contactless device replies with an information block that is also empty or contains an error status.

Moreover, batteries even just a few hundred micrometers thick can be made to enable them to be integrated into the body of the card. In the case of rechargeable batteries, their use is currently limited to cards where the supply is made by contact in order to have a sufficient energy contribution.

However, recharging a battery through the electromagnetic communication field poses a few problems. The electromagnetic field serves to supply the card on the one hand and to communicate with the card on the other. This double use of the electromagnetic field only just enables supply of the chip in the smart card while modulating the field for communication. Over-consumption, which could be associated for example with recharging an internal battery in the smart card, would cause a disturbance in the electromagnetic field that could also induce communication errors between the card and the reader. In addition, data exchanges between the reader and the card being totally unpredictable, no time interval can be reserved by the card to carry out this recharging. Consequently, it is advisable to make preferential use of a more appropriate means of charging the battery.

SUMMARY OF THE INVENTION

One aspect of the invention concerns a process for maximising charging of a battery in a portable device having power supplied by its electromagnetic communication field.

According to a first embodiment, the invention relates to a recharging process for the battery of a portable object communicating with a reader establishing communication using a modulated electromagnetic field that provides power to the portable object. The portable object has a rechargeable battery. The portable object sends at least one waiting message to the reader, the said waiting message telling the reader a waiting time before the next message. The portable object uses energy from the electromagnetic field to recharge its battery during the waiting time.

Preferentially, the portable object can send at least one adjustment message to the reader to adjust the power of the electromagnetic field. The adjustment message can be a message of the same type as the waiting message, which has a shorter waiting time. Several adjustment messages can be sent until the electromagnetic field reaches the power level matching the desired power level to charge the battery.

According to a second embodiment, the invention relates to a portable object communicating using a modulated electromagnetic field. The portable object include means of recovering energy from the electromagnetic field, means of communication to demodulate and modulate messages over the electromagnetic field, means of processing, and a battery enabling the means of processing to function outside the electromagnetic field. The portable object includes a battery recharging mode during which the means of processing sends at least one waiting message to the reader. The said waiting message tells the reader a waiting time before the next message. The portable object uses energy from the electromagnetic field to recharge its battery during the waiting time.

BRIEF DESCRIPTION OF THE DRAWINGS

The invention will be better understood, and other features and advantages will appear on reading the following description, the description making reference to the appended drawings, amongst which.

DETAILED DESCRIPTION

Figure 1:
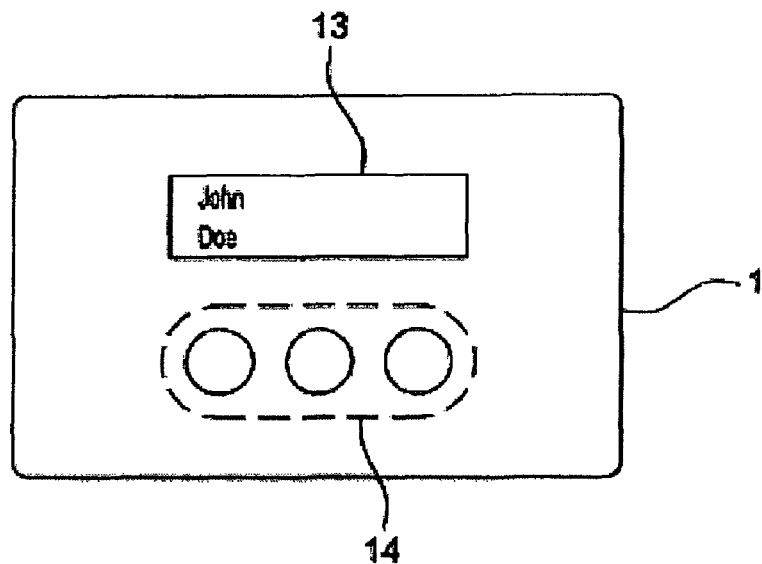
FIG. 1 represents an example of the card according to the invention.
Figure 2:
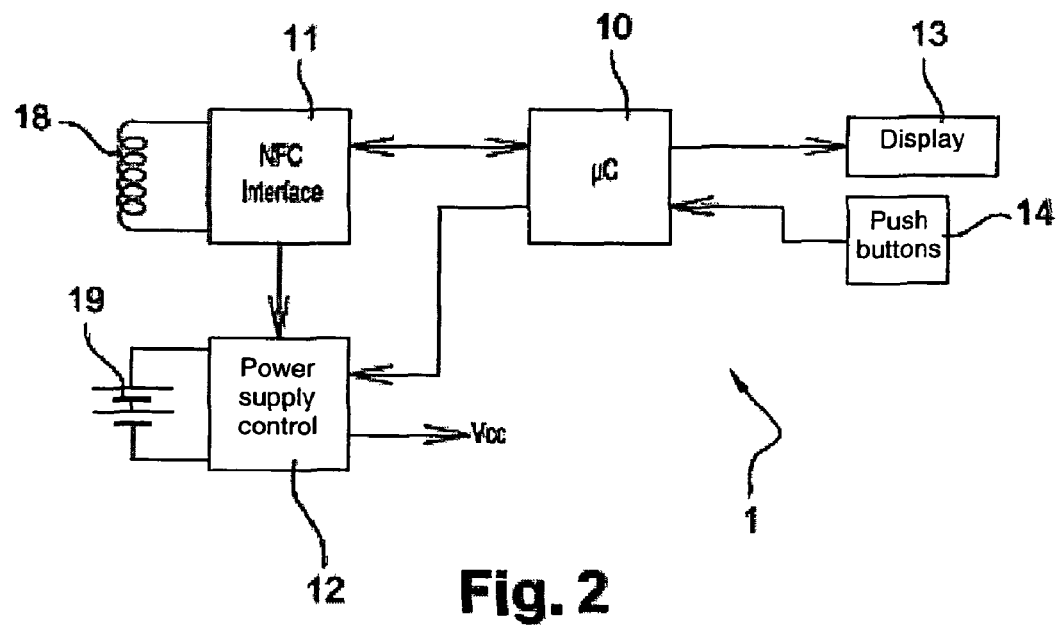
FIG. 2 represents the structural design of the card in FIG. 1.

By way of an example of the use of the invention, consider card 1 represented by FIGS. 1 and 2. Card 1 is, for example, a contactless smart card used to control access. Such a smart card 1 enables, on the one hand, identification of the cardholder by the use of contactless readers and, on the other hand, displaying of information such as for example the name of the cardholder or other information. Clearly, the invention concerns any other smart card with a contactless interface and having functionalities requiring a battery.

Smart card 1 includes a microcontroller 10, a contactless communication interface 11, a power supply circuit 12, a display device 13 and push buttons 14. The microcontroller 10 is the core of smart card 1, it includes all the means of data storage and processing of the smart card. Microcontroller 10 provides management of all components of smart card 1.

The communication interface 11 is a passive contactless type interface complying with ISO standard 14443 (Contactless Proximity Card) or the Near Field Communication (NFC) standard. This interface 11 enables the microcontroller 10 to communicate with the reader through the electromagnetic field, which further enables the card to be powered during the communication. For this purpose, interface 11 includes an inductive antenna 18 that also serves as a half-transformer to recover energy from the electromagnetic field provided by the reader. According to a preferred method of execution, this interface 11 complies with ISO standard 14443 and numerous means of execution are available for the expert.

The power supply circuit 12 firstly receives energy recovered by the interface 11 and has a battery 19. This power supply circuit 12 enables powering of all components of the card based on commands received from the microcontroller 10. According to the invention, this power supply circuit enables all or part of the energy recovered by interface 11 to be directed towards the battery to recharge it. The power supply circuit is controlled by microcontroller 10.

The display device 13 is for example a thin liquid crystal screen with low power consumption. The display device is controller by microcontroller 10 in order to display different messages intended for a user. The push buttons 14 allow a user to send commands to the microcontroller 10. The push buttons 14 constitute input keys enabling, for example, selection of information to be displayed on the display device and initiate generation of a single use password.

Smart card 1 has a first operating mode in contact with a card reader during which microcontroller 10 exchanges data with the said reader. During this first operating mode, the smart card is powered by the reader's electromagnetic field. Battery 19 can be disconnected by the power supply circuit 12.

In a second operating mode, card 1 functions independently. Battery 19 is then connected by the power supply circuit to power the different components of the card. This second operating mode is usable as long as the battery is sufficiently charged to supply the energy necessary for operation of the different components of the card. A non-rechargeable smart card battery has a lifetime that depends on the use made of the card. If this use is too intensive, the battery life and therefore the card life are significantly reduced. To that effect, it is proposed to use a battery 19 rechargeable from the energy of the electromagnetic field.

Recharging of the battery can be done either automatically or manually. Manual initiation can be done, for example, by pressing one of the push buttons 14. This recharging can be performed either by putting the card on a reader for a certain period of time or each time the card is close to a reader.

Figure 3:
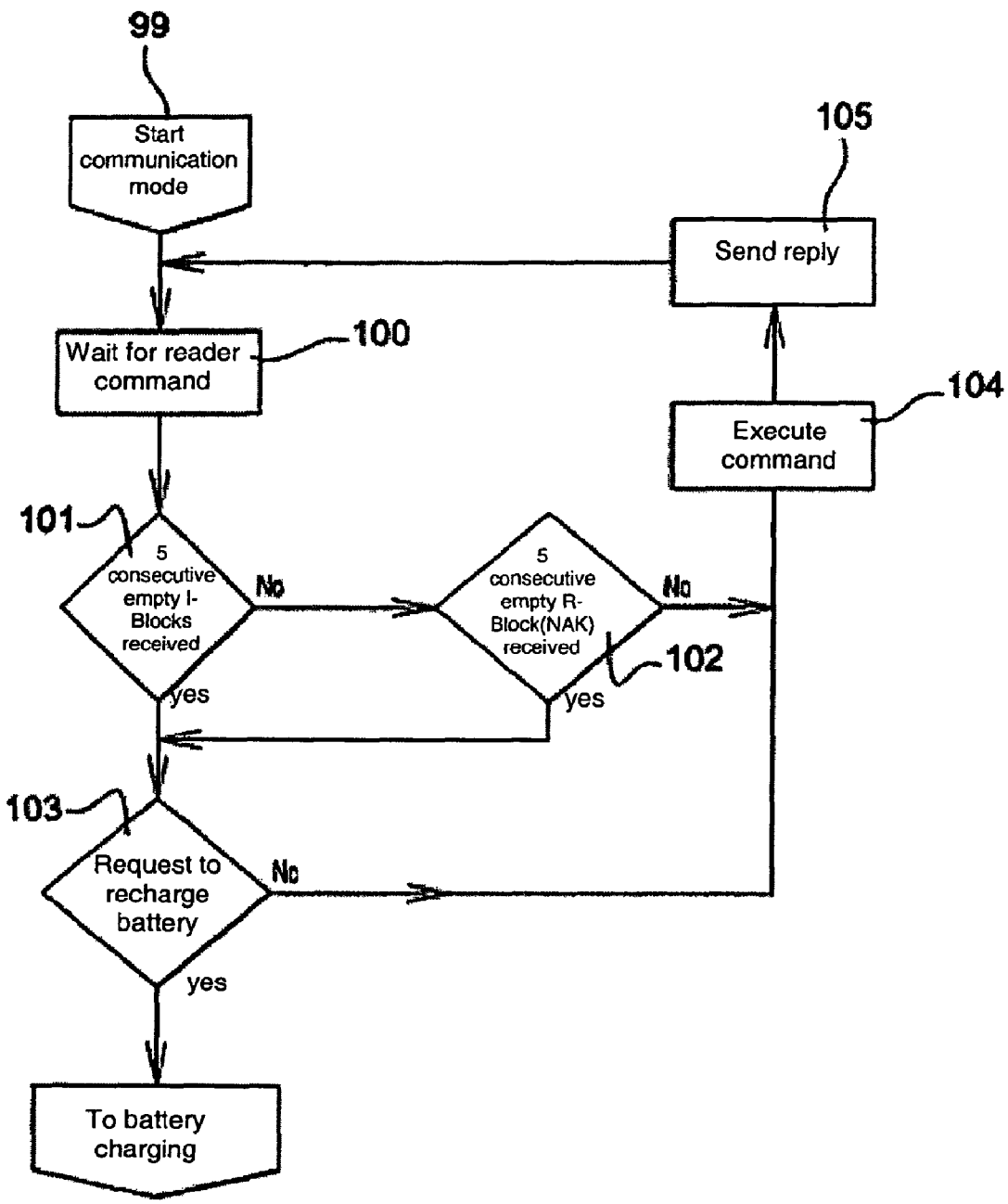
FIG. 3 represents an operating flow chart for the card in communication mode.

By way of an example, FIG. 3 shows a flow chart representing the start of a communication mode for card 1. The beginning 99 of this flow chart starts when the card is put in an electromagnetic field. Communication takes place in accordance with standard ISO 14443 as long as communication is desired by the reader or by card 1. When communication between card 1 and the reader is suspended the reader then continuously transmits "non-useful" blocks, of type R-Block (NAK) or empty I-Block, as described previously, in order to detect the presence of card 1. If the card detects a pre-defined number of consecutive "non-useful" blocks, for example 5, during tests 101 and 102, and charging is required, during test 103, then card 1 switches into a recharging mode described by the flow chart in FIG. 4.

By way of an example, test 103 is carried out by verifying during suspension of communication if a status bit for microcontroller 10 was set to require battery charging. The status bit can be activated manually by pressing one of the push buttons 14 or automatically, for example when the power supply circuit 12 detects a charge level in battery 19 lower than a predetermined threshold.

Figure 4:
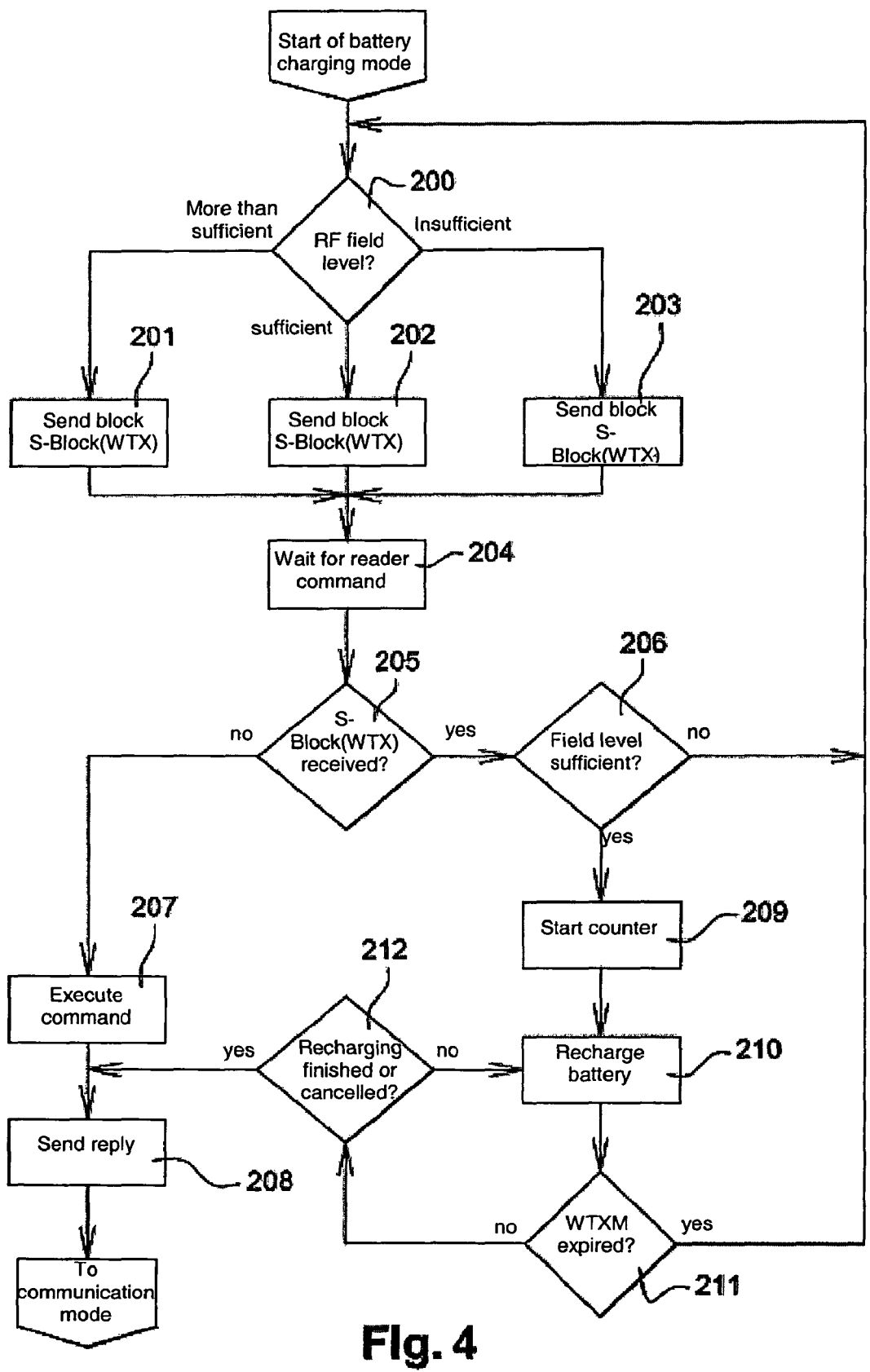
FIG. 4 represents an operating flow chart for the card in charging mode.

FIG. 4 shows how battery recharging takes place. First of all, a power level verification step 200 compares the level of the magnetic field with the power level required in order to determine if the power received through the electromagnetic field is insufficient, sufficient or more than sufficient. Depending on the power level, a step 201, 202 or 203 is performed to send an adjustment message. This step 201, 202 or 203 to send an adjustment message corresponds, in the context of using ISO standard 14443, to sending a type S-Block(WTX) message.

Among the S-Block type messages, there is a message requesting additional time known under the acronym WTX (Waiting Time eXtension), abbreviated as S-Block(WTX). Such a message includes a parameter indicating the power level, abbreviated PL (Power Level) in the standard. The parameter PL indicating power level can have four separate values:

| Binary value | Definition |
|---|---|
| 00 | Insufficient power for full functionality. |
| 01 | PICC card does not support the power level indication. |
| 10 | Sufficient power for full functionality. |
| 11 | More than sufficient power for full functionality. |

If, during step 200, power is judged insufficient, step 203 will then send an S-Block(WTX) type message with a value PL=00b. If, during step 200, power is judged sufficient, step 202 will then send an S-Block(WTX) type message with a value PL=10b. If, during step 200, power is judged more than sufficient, step 201 will then send an S-Block(WTX) type message with a value PL=11b.

This parameter is normally used by the card to indicate whether or not the power of the electromagnetic field is sufficient to perform a reading command. The power needed generally depends on the type of operation to be performed. For example, writing to a flash memory in the card will require more energy than reading. In the scope of the invention, the power information is used by the card to indicate whether or not the power of the electromagnetic field is sufficient to recharge the battery.

The S-Block(WTX) message also includes a WTXM parameter that indicates the waiting time. For adjustment messages it is advisable to set this parameter so that it corresponds to a minimum time value. At step 204 the card waits for a command from the reader, which must reply by an identical S-Block(WTX) type message to give card 1 the additional waiting time requested. Step 205 checks the type of message received. If the message is not type S-block(WTX), the received message is executed at step 207, a reply is sent to the reader at step 208 and the card returns to the communication mode described by the flow chart in FIG. 3. If the S-block(WTX) message is indeed received, a check is made to see if the power of the field is sufficient for charging the battery during step 206.

If the power level of the field is not sufficient then the process returns to step 200 to adjust the power level. If the power level of the field is sufficient then the process initiates a time counter at step 209 that corresponds to a WTXM request for additional time, corresponding in turn to the maximum time value of an S-Block(WTX) type waiting time message sent simultaneously. Power to most of the card's components is then cut so that as much power as possible is used to recharge the battery and recharging step 210 is carried out.

Recharging step 210 having started, step 211 is carried out to check if the WTXM additional waiting time has expired. If this is the case, the process returns to step 200 in order to reissue a new request for additional time to the reader. If the WTXM additional waiting time is still running, step 212 is carried out in order to check if the battery has finished charging, or if microcontroller 10 has sent a command to cancel recharging. If the battery has finished charging, then the flow chart finishes by resending the reply to the reader command (R-Block(NAK) or Empty I-Block, depending on the detection mode used). If the battery is not completely charged, the process loops to step 210.

The mode of execution that has just been described is a non-limiting example of execution. Numerous execution variants are possible. In particular, reference has been made to ISO standard 14443 although the invention can be applied to any other standard that uses a modulated electromagnetic field to communicate. Equally, the PC/SC standard can be replaced by another standard of the same type that controls data exchanges between a reader and a card.

The invention claimed is:

1. A process of recharging a battery (19) in a portable object (1) communicating with a reader establishing communication over a modulated electromagnetic field that further enables powering of the portable object, the portable object furthermore having a rechargeable battery the process comprising:
    operating the portable object to send at least one waiting message to the reader, the waiting message telling the reader a waiting time (WTXM) before the next message; and
    operating the portable object to use the energy of the electromagnetic field to recharge the battery during the waiting time.

2. The process according to claim 1, further operating the portable object to send at least one adjustment message (210-203) to the reader to adjust the power of the electromagnetic field.

3. The process according to claim 2, in which the adjustment message is a message of the same type as the waiting message, which has a shorter waiting time.

4. The process according to claim 2, in which the portable object is operated to send several adjustment messages until the electromagnetic field reaches a power level matching the desired power level to charge the battery.

5. The process according to claim 1, in which the communicating portable object and the reader comply with ISO standard 14443 and in which the waiting messages are S-Block (WTX) type messages having a significant waiting time.

6. The process according to claim 2 or 5, in which the adjustment message is an S-Block(WTX) type message, which has a shorter waiting time than a waiting message.

7. A portable object (1) communicating over a modulated electromagnetic field with a reader, the portable object comprising:
    a means of recovering energy (18) from the electromagnetic field;
    means of communication (11) in order to demodulate and modulate messages over the electromagnetic field;
    means of processing (10);
    a battery (19) allowing the means of processing to operate outside the electromagnetic field;
    a means of recharging the battery during which the means of processing (19) sends (209) at least one waiting message to the reader, the said waiting message telling the reader a waiting time before the next message; and
    means whereby the portable object uses the energy of the electromagnetic field to recharge the battery during the waiting time.

8. The portable object of claim 7 wherein the means whereby the portable object uses the energy of the electromagnetic field to recharge the battery during the waiting time is further operable to shut down other components of the portable object during the waiting time thereby making additional power available for recharging the battery.

9. The process of recharging a battery (19) in a portable object (1) of claim 1 further comprising:
    shutting down other components of the portable object during the waiting time thereby making additional power available for recharging the battery.

10. A portable object communicating over a modulated electromagnetic field with a reader, the portable object comprising:
    an electromagnetic-field energy-receiving circuit;
    a battery allowing the means of processing to operate outside the electromagnetic field;
    a power supply circuit connected to the electromagnetic-field energy-receiving circuit and connected to the battery;
    a processor connected to the power supply circuit operable to direct the power supply circuit to cause energy received from the electromagnetic-field energy-receiving circuit to be used to recharge the battery during a recharging period defined by a waiting period transmitted by the processor to the reader, the said waiting message telling the reader a waiting time before the next message.

11. The portable object communicating over a modulated electromagnetic field with a reader of claim 10 wherein the power supply circuit is further operable to shut down other components of the portable object during the waiting time thereby making additional power available for recharging the battery.

\* \* \* \* \*